United States Patent
Seto

(10) Patent No.: US 10,545,649 B2
(45) Date of Patent: Jan. 28, 2020

(54) INFORMATION PROCESSING APPARATUS, DISPLAY CONTROL METHOD FOR INFORMATION PROCESSING APPARATUS, AND STORAGE MEDIUM

(71) Applicant: CANON KABUSHIKI KAISHA, Tokyo (JP)

(72) Inventor: Hidekazu Seto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 15/008,324

(22) Filed: Jan. 27, 2016

(65) Prior Publication Data

US 2016/0224224 A1 Aug. 4, 2016

(30) Foreign Application Priority Data

Jan. 29, 2015 (JP) ................................. 2015-015214

(51) Int. Cl.
*G06F 3/0484* (2013.01)
(52) U.S. Cl.
CPC ................................. *G06F 3/04845* (2013.01)
(58) Field of Classification Search
CPC ..................... G06F 3/1423; G06F 3/14; G06F 3/048–04886; G06F 17/30011–30941; G06F 3/04845; G06T 3/40; H04M 1/72533
See application file for complete search history.

(56) References Cited

U.S. PATENT DOCUMENTS

| | | | | |
|---|---|---|---|---|
| 2004/0113935 A1* | 6/2004 | O'Neal | ................... | G01N 30/56 715/732 |
| 2010/0169790 A1* | 7/2010 | Vaughan | ............... | G06F 3/0481 715/740 |
| 2013/0106888 A1* | 5/2013 | Penner | ................... | G06F 3/0484 345/582 |
| 2013/0117658 A1* | 5/2013 | Fidler | ................. | G06F 17/3061 715/234 |

(Continued)

FOREIGN PATENT DOCUMENTS

JP 2013-190870 A 9/2013

OTHER PUBLICATIONS

Making Presentation with Two Monitors Using Presenter Tool, web page, publisher—Microsoft Office PowerPoint 2007 support (partial English translation of original Japanese language document at http://office.microsoft.com/ja-jp/powerpoint-help/HA010067383.aspx).

*Primary Examiner* — Dino Kujundzic
(74) *Attorney, Agent, or Firm* — Canon U.S.A., Inc. IP Division

(57) ABSTRACT

An information processing apparatus, which communicates with an external display apparatus, includes a specifying unit configured to specify a first object to be enlarged and displayed by the external display apparatus among a plurality of objects included in a page image, an acquisition unit configured to acquire a second object to be next enlarged and displayed by the external display apparatus from the page image, and a display control unit configured to display the page image on a display unit so that the first object and the second object are displayed with a positional relationship in the page image between the first object and the second object maintained.

20 Claims, 11 Drawing Sheets

(56) References Cited

U.S. PATENT DOCUMENTS

| | | | |
|---|---|---|---|
| 2013/0167070 A1* | 6/2013 | Tsuda | G06F 3/04845 |
| | | | 715/785 |
| 2014/0173394 A1* | 6/2014 | Kashibuchi | G06F 17/211 |
| | | | 715/201 |
| 2015/0067456 A1* | 3/2015 | Kashibuchi | G06F 17/211 |
| | | | 715/201 |
| 2015/0067489 A1* | 3/2015 | Zotto | G06T 3/0025 |
| | | | 715/268 |
| 2015/0277715 A1* | 10/2015 | Wang | G06F 3/04845 |
| | | | 345/661 |
| 2016/0041621 A1* | 2/2016 | Naya | H04N 9/3179 |
| | | | 345/173 |
| 2016/0155212 A1* | 6/2016 | Ogasawara | G06T 3/40 |
| | | | 715/732 |

* cited by examiner

FIG.3E

| OBJECT NAME | ATTRIBUTE | PAGE NUMBER | COORDINATE X | COORDINATE Y | WIDTH W | HEIGHT H | DISPLAY ORDER | CHARACTER SIZE | DATA |
|---|---|---|---|---|---|---|---|---|---|
| OBJECT A | GROUP | 1 | X1 | Y1 | W1 | H1 | 1 | — | ... |
| OBJECT B | CHARACTER | 1 | X2 | Y2 | W2 | H2 | 2 | F2 | ... |
| OBJECT C | CHARACTER | 1 | X3 | Y3 | W3 | H3 | 3 | F3 | ... |
| OBJECT D | GRAPHIC | 1 | X4 | Y4 | W4 | H4 | — | — | ... |
| OBJECT E | GRAPHIC | 1 | X5 | Y5 | W5 | H5 | 4 | — | ... |
| OBJECT F | GRAPHIC | 1 | X6 | Y6 | W6 | H6 | — | — | ... |
| OBJECT G | CHARACTER | 1 | X7 | Y7 | W7 | H7 | 5 | F7 | ... |
| OBJECT H | CHARACTER | 2 | X8 | Y8 | W8 | H8 | — | F8 | ... |
| OBJECT I | GRAPHIC | 2 | X9 | Y9 | W9 | H9 | 6 | — | ... |
| OBJECT J | GRAPHIC | 2 | X10 | Y10 | W10 | H10 | 7 | — | ... |

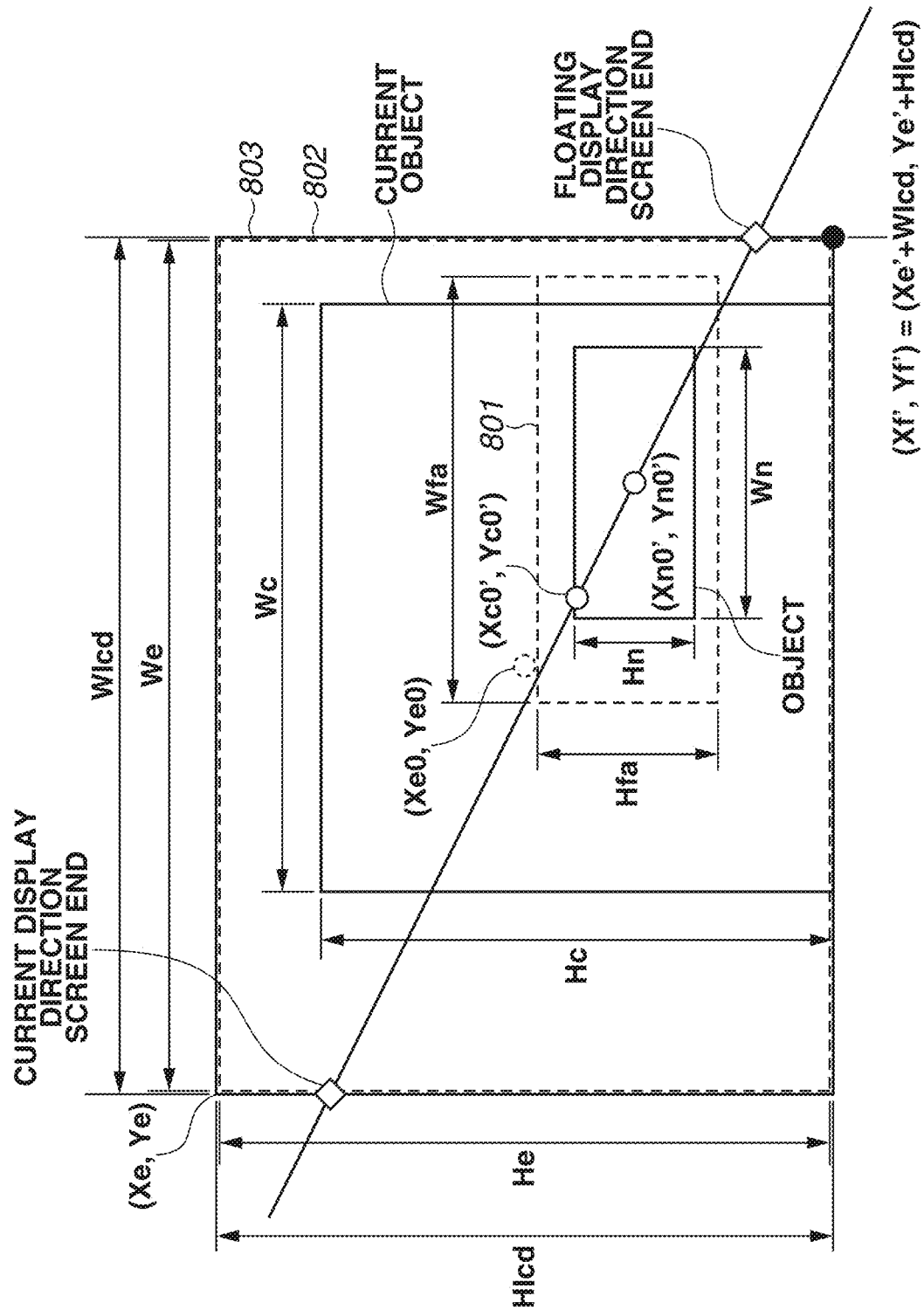

INFORMATION PROCESSING APPARATUS, DISPLAY CONTROL METHOD FOR INFORMATION PROCESSING APPARATUS, AND STORAGE MEDIUM

BACKGROUND OF THE INVENTION

Field of the Invention

The present invention relates to an information processing apparatus, a display control method for the information processing apparatus, and a program.

Description of the Related Art

There is a technique for identifying document constituent elements (objects) such as characters and pictures constituting a document and sequentially enlarging and displaying the objects in the document in an information processing apparatus (Japanese Patent Application Lad-Open No. 2013-190870). The technique enables a user to sequentially browse the document object by object.

When the information processing apparatus is further connected to a large-sized external display to display the document, many people can browse the same document. Accordingly, the information processing apparatus can be used as a presentation tool.

However, in the technique, one of the objects in a document page is enlarged and displayed in a full screen, so that an object to be next enlarged and displayed cannot be seen with the object currently being displayed at the same time. As a result, when such an information processing apparatus is used as the presentation tool, a presenter may not know which of the objects is to be next displayed during the explanation, and may not know how far the content is to be talked about at the present time point.

Some conventional software for presentation has a dedicated function. For example, in a presenter tool (help for Microsoft Office PowerPoint 2007 "Making Presentation with Two Monitors Using Presenter Tool" (see http://office.microsoft.com/ja-jp/powerpoint-help/HA010067383.aspx) in Microsoft Office Power Point 2007 (trademark) by Microsoft Corporation, a method is discussed in which screens for a presenter and an audience are individually provided, a current slide is displayed for the audience, and a slide that is being displayed and thumbnails of several slides preceding and succeeding the current slide is displayed for the audience.

However, the tool is used to display the current slide and its preceding and succeeding slides in a slide unit (a page unit), and does not consider a case where the slide (page) is enlarged and displayed for each object in the slide (page).

In a case where the objects in the page are sequentially enlarged and displayed, it is desirable that the presenter is able to grasp a content of the succeeding object scheduled to be next enlarged and displayed while also grasping where the succeeding object is arranged in the page.

SUMMARY OF THE INVENTION

The present invention is directed to displaying, on a presenter screen, a current object that is being enlarged and displayed on an external display apparatus and a succeeding object that is to be next enlarged and displayed while allowing a presenter to easily grasp a positional relationship between the objects in a document.

An information processing apparatus according to the present invention has a configuration as described below.

According to an aspect of the present invention, an information processing apparatus, which communicates with an external display apparatus, includes a specifying unit configured to specify a first object to be enlarged and displayed by the external display apparatus among a plurality of objects included in a page image, an acquisition unit configured to acquire a second object to be next enlarged and displayed by the external display apparatus from the page image, and a display control unit configured to display the page image on a display unit so that the first object and the second object are displayed with a positional relationship in the page image between the first object and the second object maintained.

According to the present invention, a presenter can grasp a content of the succeeding object scheduled to be next enlarged and displayed, and can further grasp the positional relationship between the current object and the succeeding object.

Further features of the present invention will become apparent from the following description of exemplary embodiments with reference to the attached drawings.

BRIEF DESCRIPTION OF THE DRAWINGS

FIGS. 3A, 3B, 3C, 3D, and 3E are explanatory drawings each illustrating a structure of document data processed by the information processing apparatus.

FIG. 9 is a drawing illustrating a positional relationship between a current object display frame and a floating frame.

DESCRIPTION OF THE EMBODIMENTS

An exemplary embodiment of the present invention will be described below with reference to the drawings.
<Description of System Configuration>

Figure 1:
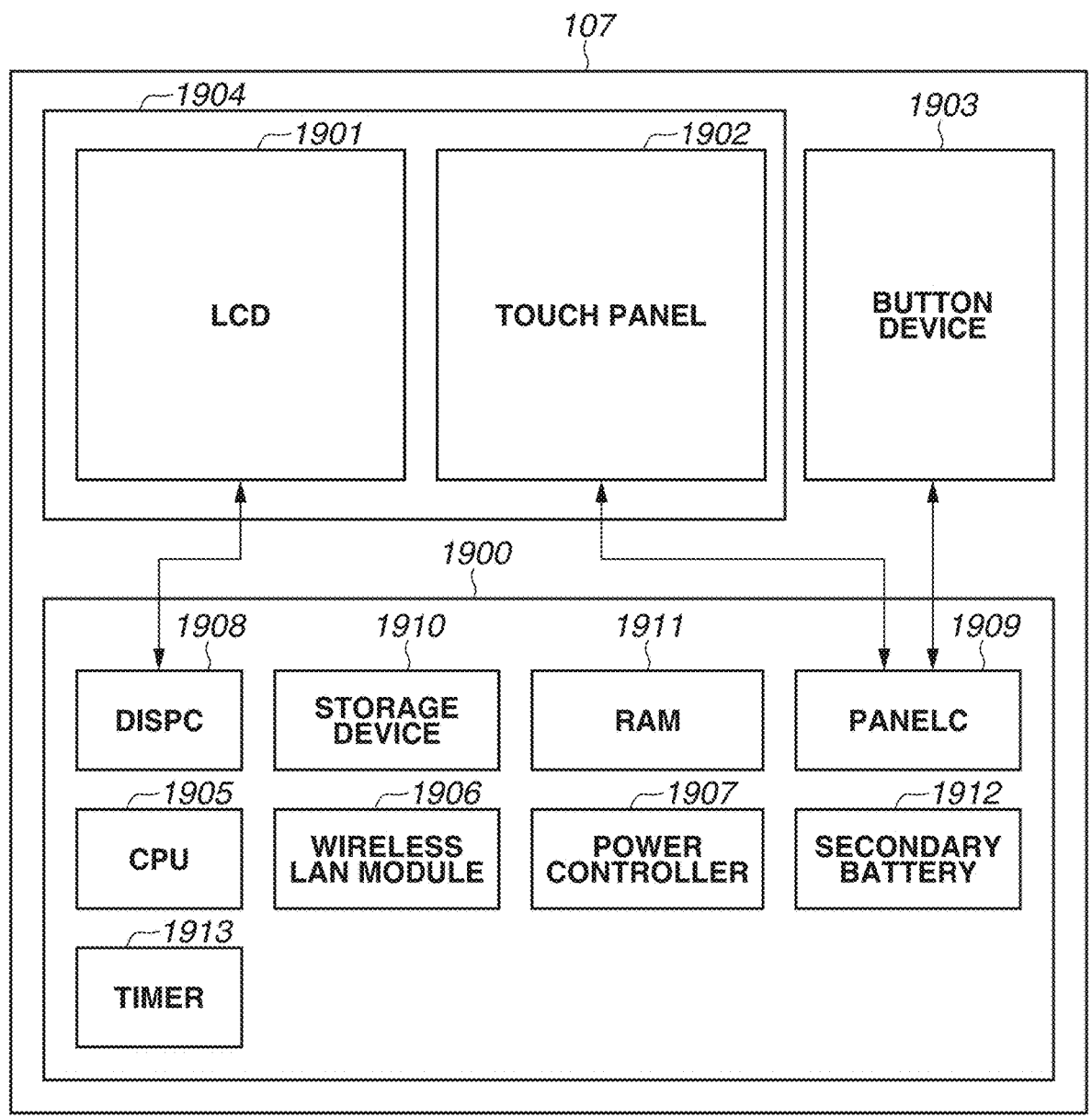
FIG. 1 is a block diagram illustrating a configuration of an information processing apparatus.

FIG. 1 is a block diagram illustrating a configuration of an information processing apparatus according to the present exemplary embodiment. In the present exemplary embodiment, a configuration example is described using a mobile information terminal 107 as an example of the information processing apparatus. The mobile information terminal 107 has a function of transferring display data to be displayed on a screen, described below.

In FIG. 1, the mobile information terminal 107 includes a main board 1900, a liquid crystal display (LCD) 1901, a touch panel 1902, and a button device 1903. In the present exemplary embodiment, the LCD 1901 and the touch panel 1902 will be collectively referred to as a touch user interface (UI) 1904. In the present exemplary embodiment, the mobile information terminal 107 may be an information processing apparatus such as a smart phone or a tablet.

The main board 1900 includes a central processing unit (CPU) 1905, a wireless local area network (LAN) module 1906, a power controller 1907, a display controller (DISPC) 1908, and a panel controller (PANELC) 1909. Further, the main board. 1900 includes, a storage device 1910, a random access memory (RAM) 1911, a secondary battery 1912, and a timer 1913. Devices such as the CPU 1905 to the timer 1913 are connected to one another via a bus (not illustrated).

The CPU 1905 is a processor that controls each of the devices connected to the bus, and develops software stored in the storage device 1910 into the RAM 1911 to execute the developed software. The RAM 1911 functions as a main memory, a work area, a video image area to be displayed on the LCD 1901, a video image area to be displayed on an external display apparatus (not illustrated), and a document data storage area in the CPU 1905. The display controller 1908 switches a video image output developed into the RAM 1911 to a high speed in response to a request from the CPU 1905, and outputs a synchronization signal to the LCD 1901 and the external display apparatus. As a result, a video image in the RAM. 1911 is output to the LCD 1901 and the external display apparatus in synchronization with the synchronization signal output by the display controller 1908 so that an image is displayed on the LCD 1901 and the external display apparatus.

The panel controller 1909 controls the touch panel 1902 and the button device 1903 in response to the request from the CPU 1905. Under the control, the CPU 1905 is notified of a position, on the touch panel 1902, at which an indicator such as a finger or a stylus pen presses and a pressed key code on the button device 1903.

Press position information includes a coordinate value representing an absolute position in a transverse direction (hereinafter referred to as an x-coordinate) of the touch panel 1902 and a coordinate value representing an absolute position in a longitudinal direction (hereinafter referred to as a y-coordinate) of the touch panel 1902. The coordinates correspond to a pixel position on the LCD 1901. In the present exemplary embodiment, the origin is an upper left end of the touch panel 1902. The touch panel 1902 can detect that a plurality of points has been pressed. If the touch panel 1902 detects that the plurality of points has been pressed, the CPU 1905 is notified of press position information corresponding to the number of the pressed points.

The power controller 1907 is connected to an external power supply (not illustrated), to receive the power supply. Thus, the power controller 1907 supplies the power no the entire mobile information terminal 107 while charging the secondary battery 1912 connected to the power controller 1907. When the power is not supplied from the external power supply, the power from the secondary battery 1912 is supplied to the entire mobile information terminal 107. The wireless LAN module 1906 establishes wireless communication with a wireless LAN module on a wireless access point (not illustrated) connected to the LAN 1906 based on the control CPU 1905, to mediate communication with the mobile information terminal 107. The wireless LAN module 1906 may be a known communication module such as Institute of Electrical and Electronic Engineers (IEEE) 802.11b.

The timer 1913 generates timer interruption to a gesture event generation unit (not illustrated) based on the control of the CPU 1905. The gesture event generation unit generates various gesture events such as a touch press event and a swipe event for the touch panel 1902 with a user's finger or a touch pen. A geomagnetic sensor (not illustrated) and an acceleration sensor (not illustrated) are connected to the mobile information terminal 107 via a bus.

Further, the timer 1913 detects an inclination of the mobile information terminal 107 based on the control of the CPU 1905, and changes a display orientation of the mobile information terminal 107 and issues a drawing instruction to the LCD 1901 when the mobile information terminal 107 obtains a predetermined inclination or more. When the display orientation of the mobile information terminal 107 is changed, the CPU 1905 exchanges the width and the height of the LCD 1901, and the x-coordinate and the y-coordinate of the coordinate values detected by the touch panel 1902. Then the CPU performs subsequent processes.

Figure 2:
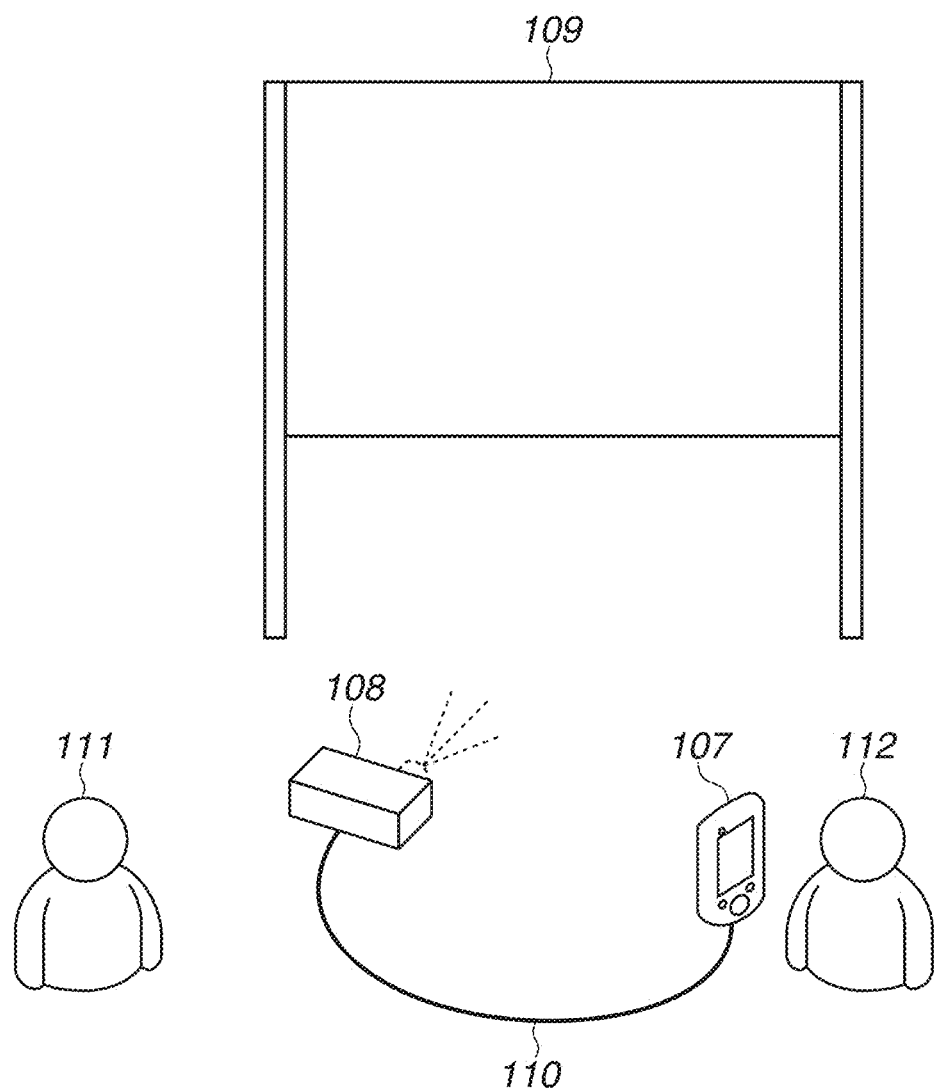
FIG. 2 is a diagram illustrating an example of an information display support system.

FIG. 2 is a diagram illustrating an example of an information display support system according to the present exemplary embodiment. This example is a configuration example of the information display support system using the mobile information terminal 107, a projector 108, and a screen 109. In this example, as an example, a presenter 112 (presentation speaker 112) who operates the mobile information terminal 107 makes a presentation for an audience 111 while viewing an image projected on the screen 109.

In FIG. 2, the mobile information terminal 107 is connected to the projector (external display apparatus) 108 via a display cable 110 or wirelessly. The projector 108 receives a synchronization signal generated by the display controller 1908 in the mobile information terminal 107 and an electric signal representing a video image, converts the synchronization signal and the electric signal into light, and projects the light onto the screen 109. As a result, the presenter 112 and the audience 111 can visually observe the video image generated by the mobile information terminal 107 on the screen 109. The external display apparatus is not limited to a combination of a projector and a screen, but may be another display such as a liquid crystal display.

FIGS. 3A, 3B, 30, 3D, and 3E are explanatory diagrams each illustrating a structure of document data processed by the information processing apparatus according to the present exemplary embodiment. The document data according to the present exemplary embodiment includes document structure data.

A table illustrated in FIG. 3E indicates document structure data. The document structure data indicates data having information about constituent elements (objects) in a document, and includes an attribute, a page number, an X-coordinate and a Y-coordinate of a position in a page, a width W, a height H, a display order, a character size, and data, with respect to each of the objects. The attribute indicates a character area rectangular object including characters, a graphic area rectangular object including graphics, and a group area rectangular object including a plurality of objects. The CPU 1905 may automatically extract each of the area rectangular objects by analyzing the document data or may set the area rectangular object based on an instruction issued by the user.

For example, the group area rectangular object is an object representing an area set based on an area designated by the user. If the plurality of objects is designated as a target, an area including the objects is the group area rectangular object. For example, an object A illustrated in FIG. 3E is an object set when an entire first page is designated. The coordinate X and the coordinate Y are X and Y coordinates of a starting point (coordinates at an upper left corner) of each of the rectangular objects in the input image (collectively referred to as position information).

The width W and the height H are respectively the width in an X-coordinate direction and the height in a Y-coordinate direction (collectively referred to as size information) of the rectangular object. The page number is a number of a page on which the object exists. The display order is an order displayed in a highlight display mode, described below, and is designated based on an instruction issued by the user. In an example illustrated in FIG. 3E, the display order is not set for objects D, F, and H, which are not designated as a highlight display target.

The character size is a numerical value included when an object is the character area rectangular object, and is an average height of the characters included in the character area rectangular object. The data represents a content of the rectangular object, and is text data when the attribute of the object is the character area rectangular object. Further, the data is binary data representing an image when the attribute is the graphic area rectangular object, and is a link to the objects constituting the group area rectangular object when the attribute is the group area rectangular object. A content of the data is omitted in the table illustrated in FIG. 3E.

When the CPU 1905 receives the document structure data, the CPU 1905 arranges each piece of the data other than the group area rectangular object based on the position information and the size information about: each of the objects in the corresponding page, and synthesizes the data as an image for a page (page image generation processing). FIG. 3A illustrates a page image 301 on a page 1 thus generated based on the document structure data illustrated in FIG. 3E.

Figure 3B:
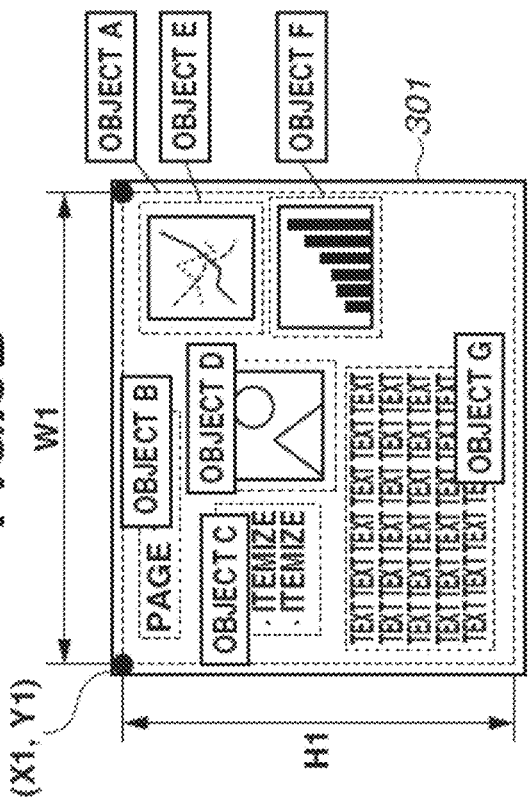

FIG. 3B illustrates an image in which each piece of information about the objects is superimposed on the page image 301. In FIG. 3B, an area enclosed by a dotted line represents each of the objects, and a position and a width/height are further illustrated for the object A.

Figure 3D:
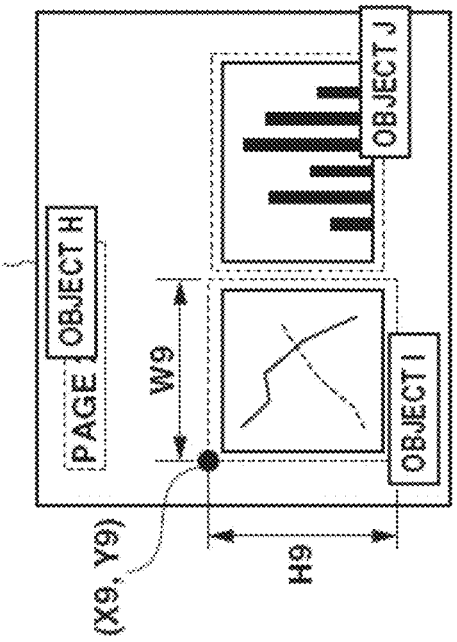
Figure 3A:
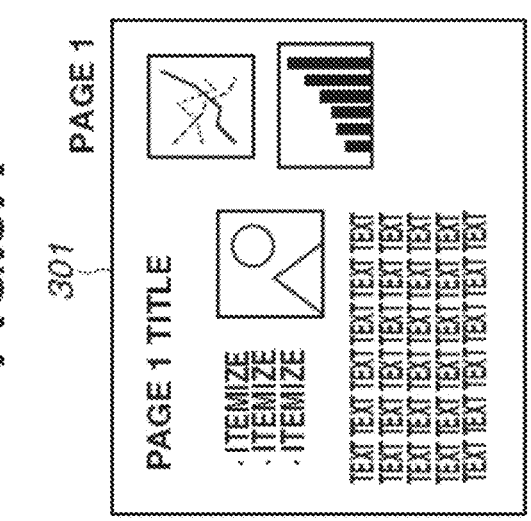
Figure 3C:
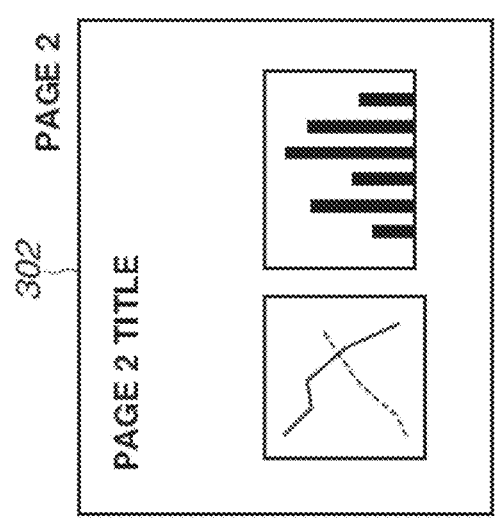

Similarly, FIG. 3C illustrates a page image 302 of a page 2 generated based on the document structure data in the table illustrated in FIG. 3E. FIG. 3D illustrates an image in which each piece of information about the objects is superimposed on the page image 302. In FIG. 3D, an area enclosed by a dotted line represents each of the objects, and a position and a width/height are further illustrated for the object I.

The document data may originally include the page image. If the document data includes the page image, the page image is used.

The CPU 1905 stores the generated page image in the RAM 1911. The CPU 1905 generates an image obtained by cropping and enlarging a part or the whole of the page image stored in the RAM 1911 according to a designated display position and an enlargement magnification, so that a display image (an audience image and a presenter image) is generated. The CPU 1905 projects and displays the audience image obtained by enlarging and displaying one of the objects in the page image using the projector 108. The CPU 1905 generates, as the presenter image, an enlarged and displayed image or a floating-displayed image including a current object that is currently being enlarged and displayed and a succeeding object to be next enlarged and displayed as the audience image. The CPU 1905 further superimposes an operation button on the presenter image, and stores the presenter image as a video image on the RAM 1911 and displays the stored presenter image on the LCD 1901.

Figure 4:
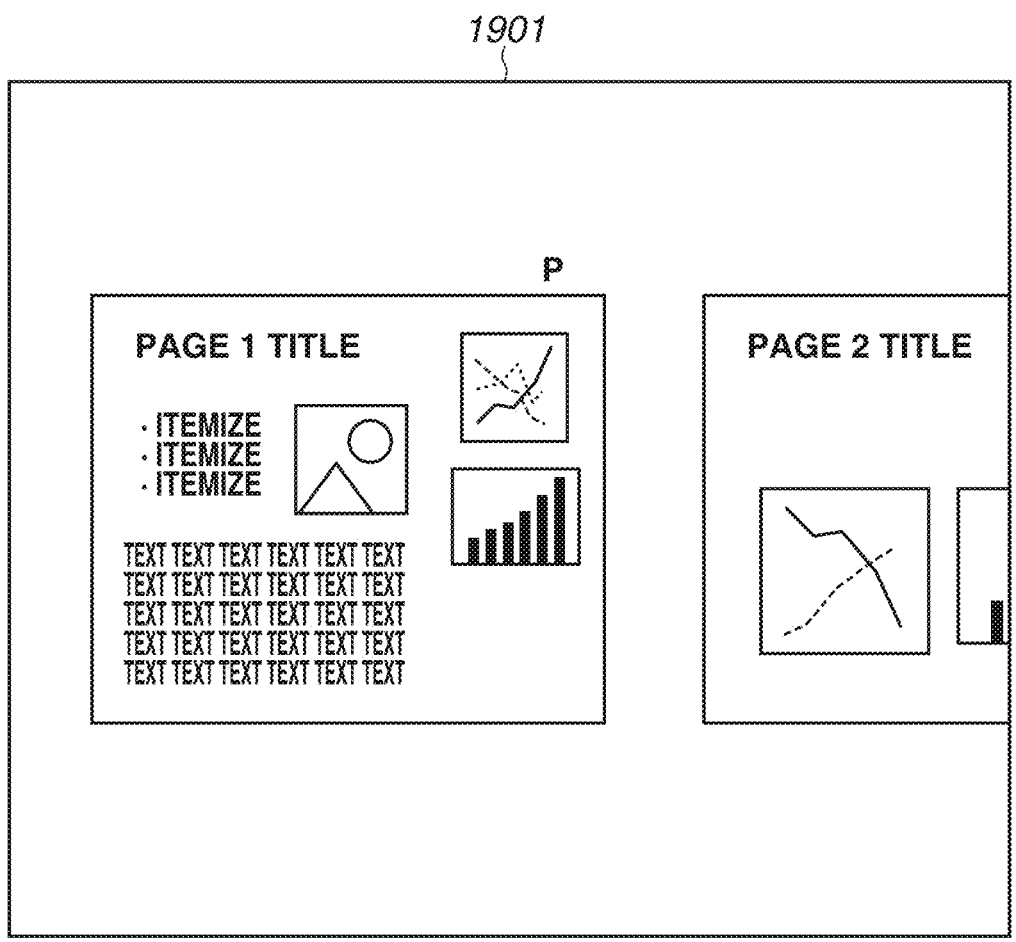
FIG. 4 is a drawing illustrating a page list screen.

FIG. 4 is a diagram illustrating a page list screen displayed on the LCD 1901 illustrated in FIG. 1. The page list screen according to the present exemplary embodiment is a screen first displayed when document data is read into an application.

On the page list screen illustrated in FIG. 4, the CPU 1905 generates a page image for each page, and displays the page images alongside. While a direction in which the page images are arranged is a horizontal direction according to the present exemplary embodiment, the direction may be a vertical direction. The CPU 1905 detects a swipe operation performed on the touch panel 1902 on the page list screen, and scrolls the page list screen.

The swipe operation indicates an operation of touching and then sliding a finger. When the CPU 1905 detects a double tap operation performed on the touch panel 1902 on the page list screen, the object that is the lowest in a display order on an operation target page is set as a "current object" (described below), and the page list screen shifts to a highlight display mode (described below). The double tap operation indicates an operation of touching and releasing a specific location continuously twice at short intervals.

Figure 5:
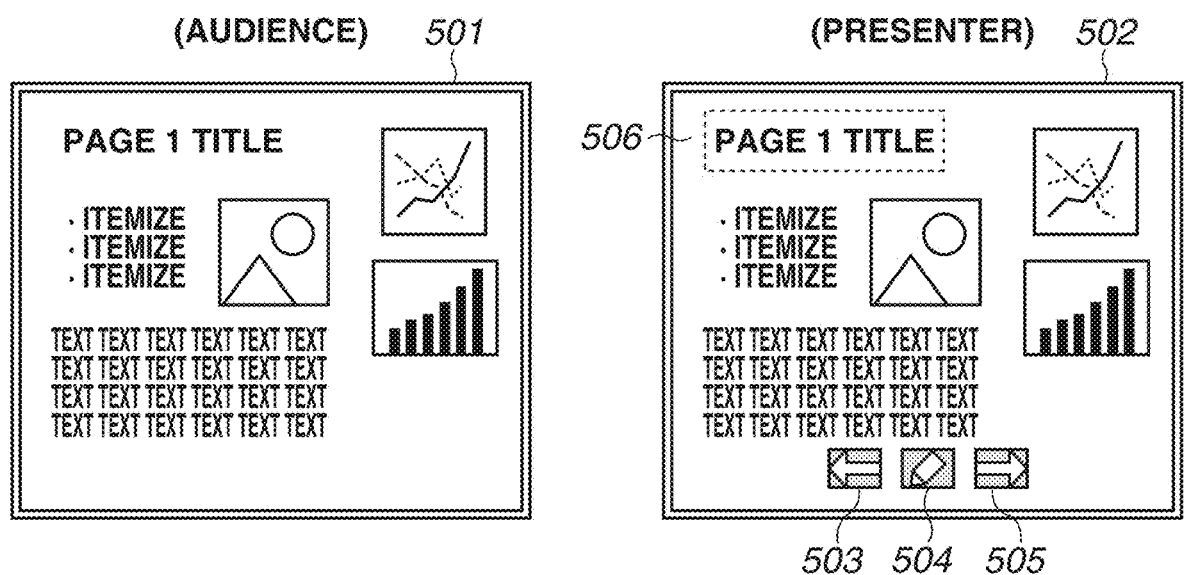
FIG. 5 is a drawing illustrating an audience image and a presenter image in a highlight display mode.

FIG. 5 is a drawing illustrating an audience image and a presenter image in a highlight display mode.

In the highlight display mode illustrated in FIG. 5, screen displays are performed differently on the projector 108 and the LCD 1901 in the mobile information terminal 107. An audience image 501 is displayed on the projector 108. The audience image 501 is scaled so that an object that is being selected (a current object) in a page fits entirely into a screen. FIG. 5 illustrates an example of screen display in a situation where the object A (FIG. 3E) is set as the current object Since the object A is an object including an entire page, the entire page is displayed as the audience image 501 illustrated in FIG. 5 If the object B (FIG. 3E) is set as the current object, the screen display is updated so that the object B part in a page is enlarged and displayed.

A presenter image 502 is displayed on the LCD 1901. The presenter image 502 is displayed so that both a current object and a succeeding object (an object that is one higher in the display order than the current object on the document structure data) fall within the screen. A method for generating the presenter image will be described below with reference to FIG. 6.

Further, areas respectively representing a "PREVIOUS" button 503, a mode switching button 504, and a "NEXT" button 505 are arranged in the presenter image 502.

When a presenter presses the "PREVIOUS" button 503, the current object is replaced with an object that precedes the current object in the display order on the document structure data to update the display. When the presenter presses the "NEXT" button 505, the current object is replaced with a succeeding object in the display order on the document structure data to update the display. When the presenter presses the mode switching button 504, On and OFF of a marker mode are switched to update the display. The marker mode is a mode for recognizing an operation performed by the presenter as a pen-writing operation and drawing a semi-transparent line at a position where the user has, touched on the touch panel 1902.

"Update display" indicates enlarging and displaying a "current object" newly set on an audience screen and displaying a screen (a screen including the current object and a succeeding object) generated based on an audience image generation flow (described below) on the presenter screen.

Figure 6:
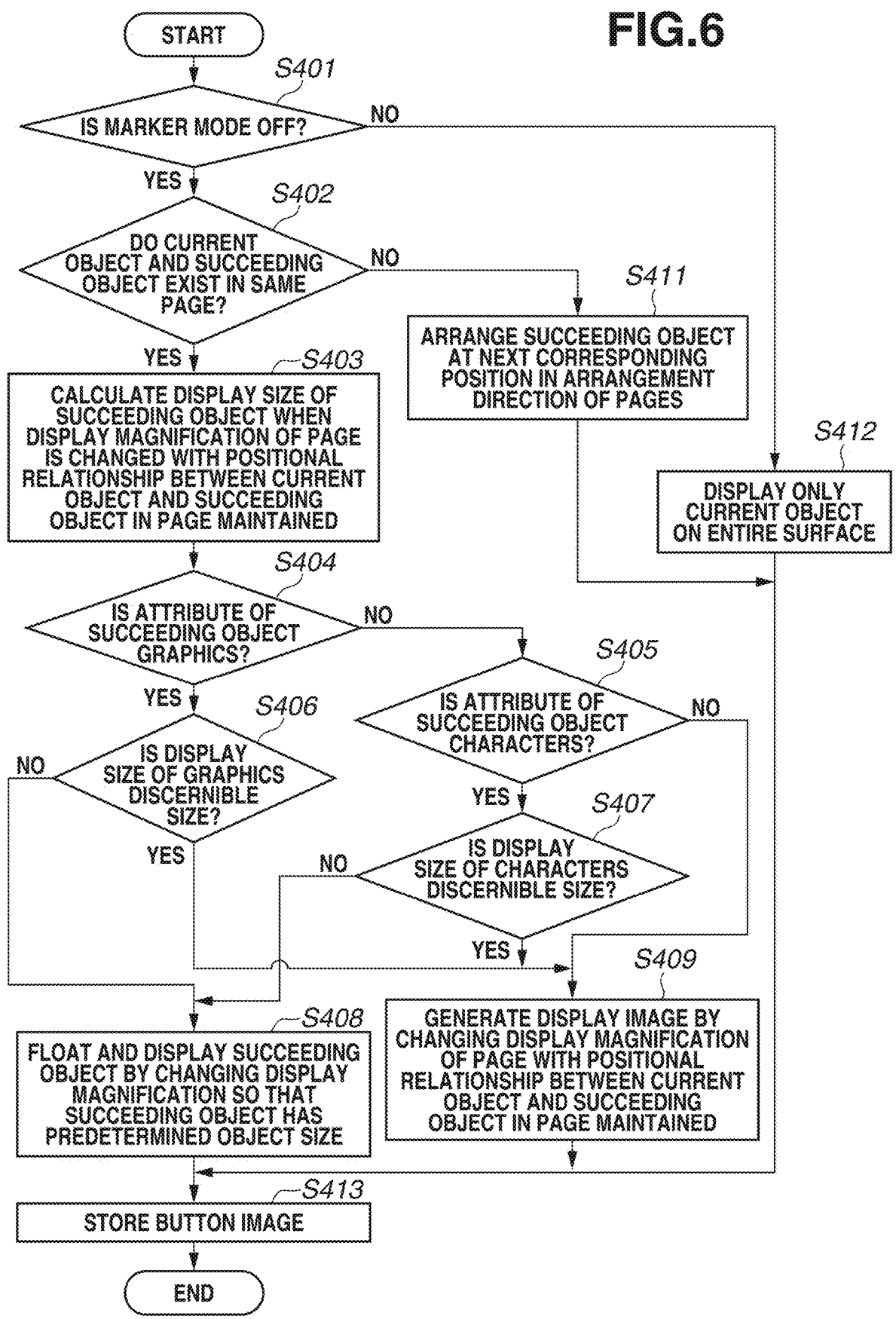
FIG. 6 is a flowchart illustrating a display control method for the information processing apparatus.

FIG. 6 is a flowchart illustrating a display control method for the information processing apparatus according to the present exemplary embodiment. FIG. 6 corresponds to a procedure of a processing example for generating a presenter image. Each of steps is implemented when the CPU 1905 executes a control program stored in the storage device 1910. This flow is implemented by the CPU 1905 when the above described page list screen shifts to the highlight display mode or when display is updated as the press of the "PREVIOUS" button 503, the mode switching button 504, or the "NEXT" button 505 is detected. When such an operation is performed, the current object is first specified. If the page list screen has shifted to the highlight display mode, for example, the object that is the first in the display order is specified as the current object based on the document structure data (FIG. 3E).

In step S401, the CPU 1905 determines whether a marker mode is currently OFF. If the CPU 1905 determines, that the marker mode is OFF (YES in step S401), the processing proceeds to step S402. If the CPU 1905 determines that the marker mode is "ON" (NO in step S401), the processing proceeds to step S412.

In step S402, the CPU 1905 acquires a succeeding object from the document data, and determines whether the current object and the succeeding object exist on the same page. If the CPU 1905 determines that the current object and the succeeding object exist on the same page (YES in step S402), the processing proceeds to step S403. If not (NO in step S402), the processing proceeds to step S411.

In step S403, the CPU 1905 calculates the display size of the succeeding object when a display magnification of a page is changed so that both the current object and the succeeding object are displayed in the screen with a positional relationship in the page between the current object and the succeeding object maintained.

Figure 7:
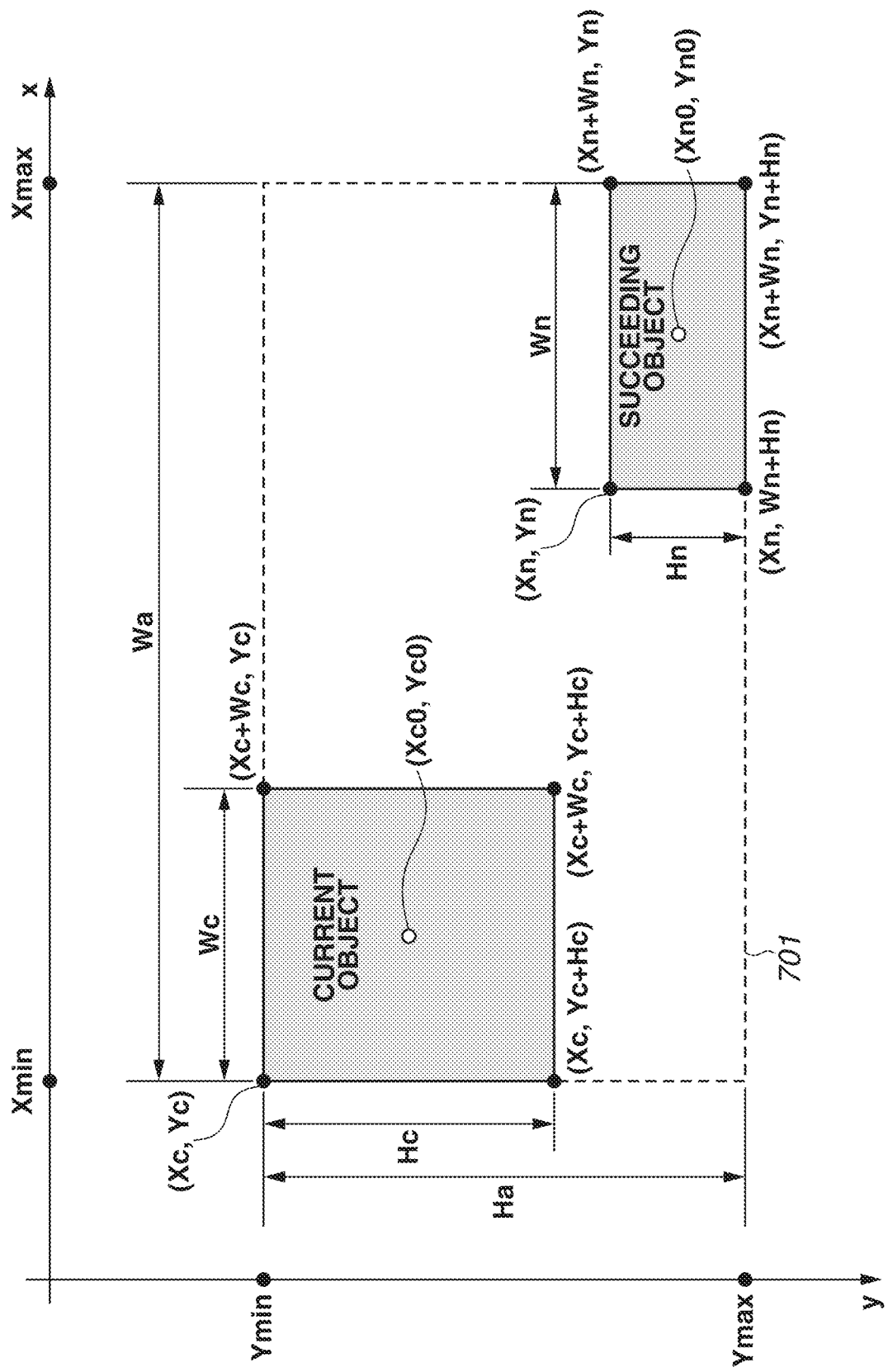
FIG. 7 is a drawing illustrating a positional relationship between a current object and a succeeding object.

FIG. 7 illustrates the positional relationship between the current object and the succeeding object. A process in step S403 will be described below while using coordinates illustrated in FIG. 7.

As an example, coordinates of the current object are (Xc, Yc), and the width and the height thereof are (Wc, Hc). Coordinates of the succeeding object are (Xn, Yn), and the width and the height thereof are (Wn, Ho). More specifically, each vertex of the current object is (Xc, Yc), (Xc+Wc, Yc), (Xc, Yc+Hc), and (Xc+Wc, Yc+Hc), and each vertex of the succeeding object is (Xn, Yn), (Xn+Wn, Yn), (Xn, Yn+Hn), and (Xn+Wn, Yn+Hn).

The minimum X-coordinate Xmin and the maximum X-coordinate Xmax are extracted from all X-coordinates (Xc, Xc+Wc, Xn, Xn+Wn). Similarly, the minimum Y-coordinate Ymin and the maximum Y-coordinate Ymax are extracted from all Y-coordinates (Yc, Yc+Hc, Yn, Yn+Hn).

A rectangular area (an enclosing rectangle 701) having (Xmin, Ymin) and (Xmax, Ymax) as its opposing corners is defined, and the width Wa (=Xmax−Xmin) and the height Ha (=Ymax−Ymin) of the rectangular area are calculated. Further, Wlcd and Hlcd are each set as the number of pixels in the vertical and horizontal directions in the LCD 1901, respectively, and smaller one, in value, of Wlcd/Wa and Hlcd/Ha, is taken as a display magnification Sa.

More specifically, the display magnification Se represents a magnification for converting the size of the enclosing rectangle 701 to such a size that the enclosing rectangle 701 fits entirely into an LCD screen with its aspect ratio maintained. The CPU 1905 obtains a standard display size An by multiplying the product of the width Wn and the height Hn by the display magnification Sa. In other words, the standard display size An is the display size of the succeeding object when a display magnification of a page is changed so that both the current object and the succeeding object are displayed within the screen with a positional relationship between the current object and the succeeding object maintained.

In step S404, the CPU 1905 checks an attribute of the succeeding object, and determines whether the attribute is graphics. If it is determined that the attribute is graphics (YES in step S404), the processing proceeds to step S406. If not (NO in step S404), the processing proceeds to step S405.

In step S405, the CPU 1905 checks the attribute of the succeeding object, and determines whether the attribute is characters. If it is determined that the attribute is characters (YES in step S405), the processing proceeds to step S407. Otherwise (NO in step S405), the processing proceeds to step S409.

In step S406, the CPU 1905 determines whether the display size of the succeeding object the attribute of which has been determined to be the graphics is larger than a predetermined size. More specifically, the CPU 1905 first acquires, from the storage device 1910, a minimum display size Ath (e.g., Wlcd×Hlcd/8) that is a discernible minimum size previously set for the graphics. If the CPU 1905 determines that the standard display size An is more than the minimum display size Ath (YES in step S406), the processing proceeds to step S409. Otherwise (NO in step S406), the processing proceeds to step S408.

In step S407, the CPU 1905 determines whether the size of the characters included in the succeeding object can be discerned. More specifically, the CPU 1905 acquires an discernible minimum character size Fth (e.g., Hlcd/16) previously set, from the storage device 1910.

Then, the CPU 1905 acquires a character size Fn on document structure data in the succeeding object, and obtains a character discernible minimum display magnification Sfa=Fth/Fn. The CPU 1905 obtains the minimum display size Ath by multiplying the product of the width Wn and the height Hn by the character discernible minimum display magnification Sfa. If the CPU 1905 determines that the standard display size An is larger than the minimum display size Ath (YES in step S407), the processing proceeds to step S409. Otherwise (NO in step S407), the processing proceeds to step S408.

In step S408, the CPU 1905 changes the display magnification of the succeeding object so that the size of the succeeding object becomes a predetermined object size (e.g., a minimum display size), to display the succeeding object so as to appear to be floating (hereinafter, floating-display).

Figure 8:
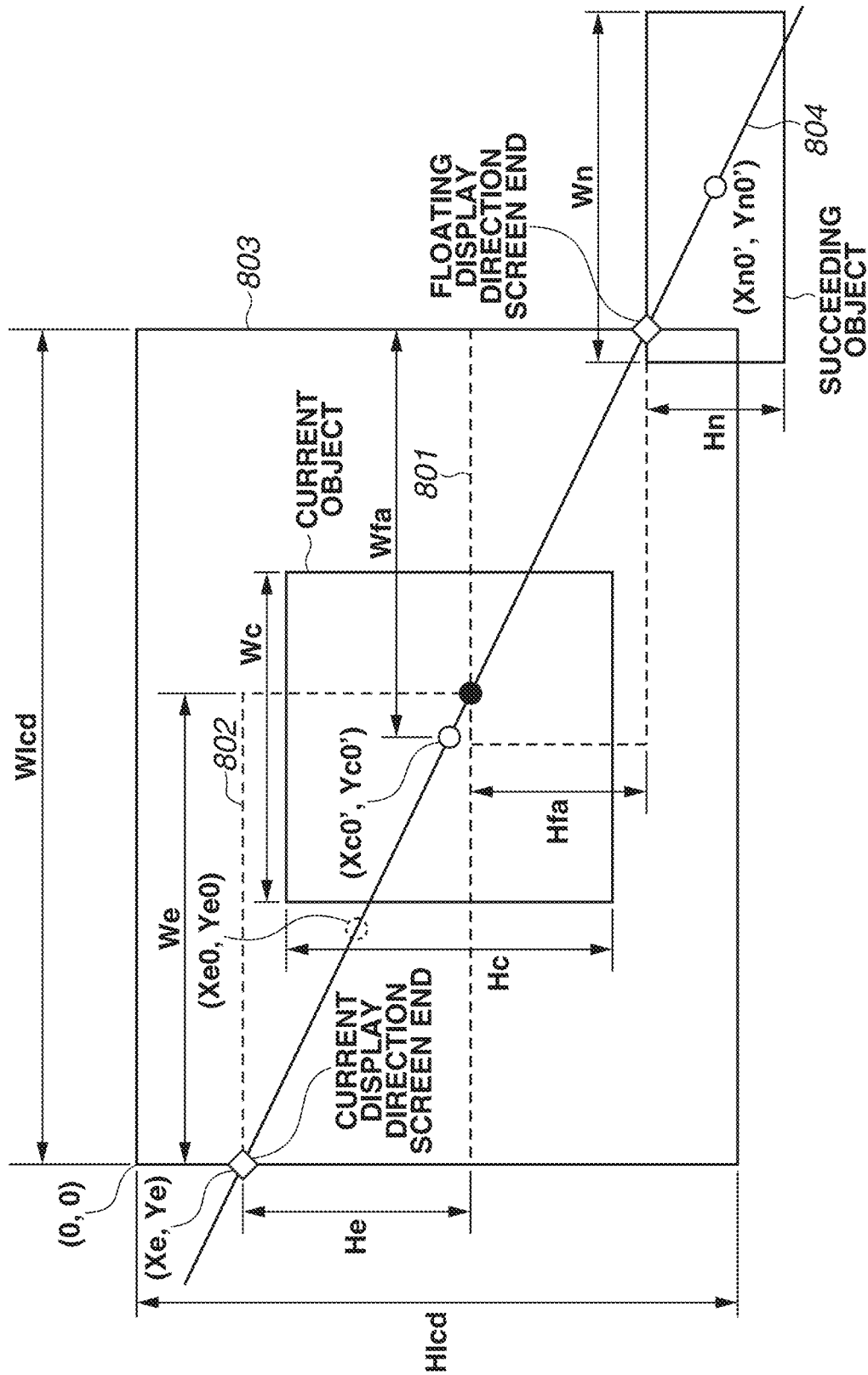
FIG. 8 is a drawing illustrating a positional relationship between a floating frame and a current object display frame.

FIG. 8 illustrates a positional relationship between a floating frame 801 and a current object display frame 802. A specific process in step S408 will be described below while using coordinates illustrated in FIG. 8.

First, the CPU 1905 obtains an enlargement magnification So=Sa*Ath/An for enlarging the display size of a succeeding object to a minimum display size, and determines the width and the height (Wf, Hf) of an image to be displayed on the floating frame 801 by multiplying each of the width Wn and the height Hn by the enlargement magnification So. That is, Wf=Wn*So and Hf=Hn*So. If the width Wf and the height Hf exceed the corresponding one of predetermined upper limit values (e.g., occupying the half of the screen), upper limit values are set as the width Wf and the height Hf. This configuration can prevent a situation where the floating frame 801 becomes so large that a current object becomes completely invisible. A margin M is added to the width and the height of the floating frame 801 itself, to obtain a width Wfa=Hf+2*M and a height Hfa=Hf+2*M.

The margin M represents a margin from an end of an image to be displayed on the floating frame 801 to the floating frame 801. Then, a blank image 803 having a width Wlcd and a height Hlcd is prepared, and a page image is arranged so that a central point of the current object in the page image is positioned at the center (Xc0', Yc0') of the blank image 803.

The CPU 1905 obtains a relative positional relationship between the central point (Xn0', Yn0') of the succeeding object and the central point (Xc0', Yc0') of the current object. More specifically, the CPU 1905 first obtains an intersection between a straight line L (a straight line 804) passing through the central point (Xc0', Yc0') and the central point (Xn0', Yn0') and the sides of the blank image 803. While two intersections of the straight line L and the sides of the blank image 803 always exist between in this example, the intersection whose X coordinate is larger than a coordinate Xc0' is selected if Xn0'>Xc0', and the intersection whose X-coordinate is smaller than a coordinate Xc0 is selected' if Xn0'<Xc0'. The CPU 1905 takes the selected intersection as a floating display direction screen end, and takes the intersection on the opposite side thereof as a current object display direction screen end.

Then, a rectangular area (the floating frame 801), which shares its one side with the side on which the floating display direction screen end exists (any one of a right end, an upper end, a left end, and a lower end of the screen), has the above described width and height (Wfa, Hfa), and has a central point existing on the straight line L and inside the blank space 803, is defined.

The CPU 1905 sets, out of intersections of the floating frame 801 and the straight line L, coordinates of the intersection close to the current display direction screen end to (Xf', Yf'). The CPU 1905 defines a rectangular area having the current display direction screen end and the coordinates (Xf', Yf') as its opposing corners as the current object display frame 802. The CPU 1905 sets coordinates of the corner opposing the coordinate (Xf', Yf') to (Xe, Ye).

The CPU 1905 calculates each ratio of the width We and the height He of the current object display frame 802 to the width Wc and the height He of the current object, respectively, and sets the smaller ratio as a correction current object display ratio Se.

In other words, Se=MIN (We/Wc, He/Hc). However, MIN (A, B) is a function for outputting the smaller one of the objects A and B. When the current object is scaled at the display magnification Se, the current object can be scaled to a maximum size falling within the current object display frame 802 with its aspect ratio maintained.

The CPU 1905 scales the page image by a factor of Se, and arranges the scaled page image so that the central point of the current object matches a central point. (Xe0, Ye0) of the current object display frame 802 in the scaled page image. A dotted line is drawn around the current object display frame 802.

This configuration allows a presenter to easily grasp which part of the page the audience is currently viewing. A pop-up frame is drawn in the floating frame 801, and the succeeding object is scaled by a factor of So and is arranged inside the pop-up frame.

The pop-up frame is drawn by drawing a rectangle having rounded corners spaced a margin M inward apart from the floating frame 801 and further drawing a triangle having the floating display direction screen end as its vertex and having its one side shared with the nearest rectangle having rounded corners. The CPU 1905 stores an image generated as described above as a presenter image in the RAM 1911.

If the succeeding object is completely included in the current object, processing which is partially different from the above described processing is performed. In step S408, the CPU 1905 first checks whether the succeeding object is completely included in the current object. If the succeeding object is not completely included in the current object, the CPU 1905 performs the above described processing. If the succeeding object is completely included in the current object, the CPU 1905 changes a part of the processing, as described below. The part to be changed is as follows.

First, the above described coordinates (Xf', Yf') and coordinates (Xe, Ye) are respectively changed to coordinates (Wlcd, Hlcd) and coordinates (0, 0). The floating frame 801 is arranged so that the central point of the succeeding object and the central point of the floating frame 801 match each other.

FIG. 9 illustrates a positional relationship between the current object display frame 802 and the floating frame 801 when the succeeding object is completely included in the current object. When the above described change is performed, the positional relationship between the current object display frame 802 and the floating frame 801 is as illustrated in FIG. 9.

In step S409, the CPU 1905 changes the display magnification of the page so that both the current object and the succeeding object are displayed within the screen with the positional relationship in the page between the current object and the succeeding object maintained, to generate a display image.

More specifically, the CPU 1905 scales an area within the enclosing rectangle 701, which has been obtained in step S403, in the page image by a factor of Sa.

The CPU 1905 draws a dotted line around each of the current object and the succeeding object, and changes the color of the inside of the succeeding object (e.g., makes the succeeding object look like blue) using a known method.

This configuration allows the presenter to easily grasp which part of the page the audience is currently viewing and which part of the page is to be displayed next. The CPU 1905 stores the image generated as described above as a presenter image in the RAM 1911. In addition, a margin area may be provided by setting the display magnification to a slightly smaller value of Sa×0.9.

In step S411, since the succeeding object is an object existing on another page, the CPU 1905 performs floating-display on the succeeding object. At this time, the succeeding object arranged at position corresponding to a next page in an arrangement direction of pages on the page list screen.

For example, if the pages are arranged in a horizontal direction, and their page numbers increase to the right, the succeeding object is arranged at a right end of the screen. More specifically, assuming that the standard display size An is equal to the minimum display size Ath, a process similar to that in step S408 is performed in which the process is changed so that the floating display direction screen end is arranged at the center of the right end of the screen.

In step S412, the CPU 1905 generates an image on which a current object, in the page image, is displayed on its entire surface.

More specifically, the page image is first scaled at a display magnification Sa, and a central point of the current object in the scaled page image is set to (Xcs0, Ycs0).

A rectangular area having (Xcs0−Wlcd/2, Ycs0−Hlcd/2) and (Xcs0+Wlcd/2, Ycs0+Hlcd/2) as its opposing corners is defined. Then, after a range of the rectangular area is cropped from the scaled page, an image in which a dotted line is drawn around the current object is stored as the presenter image in the RAM 1911.

In step S413, the CPU 1905 acquires a previously prepared button image from the storage device 1910 and superimposes the acquired button image on the presenter image, which has been acquired in step S408, S409, step S411, or S412, and stores a resultant image in the RAM 1911.

FIGS. 10A, 10B, 10C, and 10D illustrate examples of a presenter image in situations that current objects and marker modes are different in the highlight display mode.

FIGS. 10A, 10B, 10C, and 10D each illustrate an example of a presenter image that is generated through presenter image generation processing when the document structure data in the table illustrated in FIG. 3E is input.

Figure 10A:
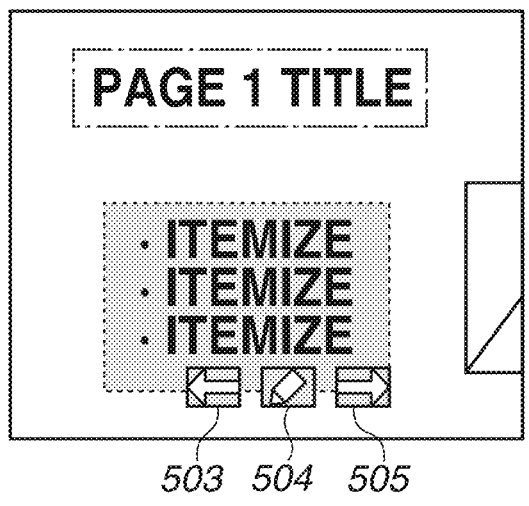
FIGS. 10A, 10B, 10C, and 10D are drawings each illustrating an example of a presenter image.

FIG. 10A illustrates a presenter image when the marker mode is OFF and the current object is an object B in the highlight display mode. The presenter image is generated in the presenter image generation processing when processes in steps S401, S402, S403, S404, S405, S407, S409, and S413 are executed in this order by the CPU 1905. More specifically, a part of a page 1 including a current object B and a succeeding object C is enlarged and displayed as the presenter image. At this time, the current object B is enlarged and displayed as the audience image on the screen 109.

Figure 10B:
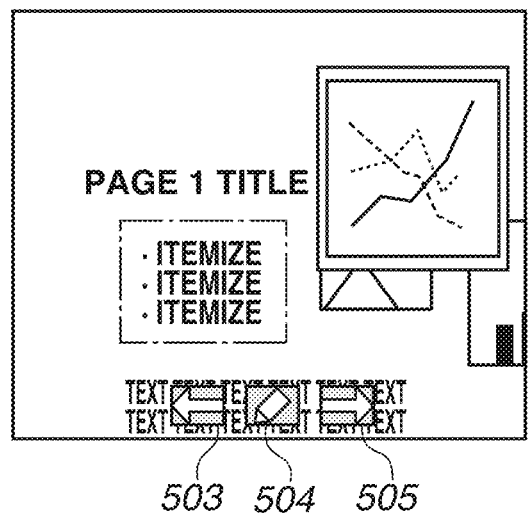

FIG. 10B illustrates a presenter image when the marker mode is OFF and the current object is an object C in the highlight display mode. A succeeding object is an object E, and the objects C and E respectively are positioned apart from each other in the page 1. Accordingly, even if a part of the page 1 including both the objects C and E is enlarged and displayed, the display size of the objects is reduced. For that reason, the object E is to be floating-displayed. The presenter image is generated in the presenter image generation processing when processes in steps S401, S402, S403, S404, S405, S406, S408, and S413 are executed in this order by the CPU 1905. At this time, the current object C is enlarged and displayed as the audience image on the screen 109.

Figure 10C:
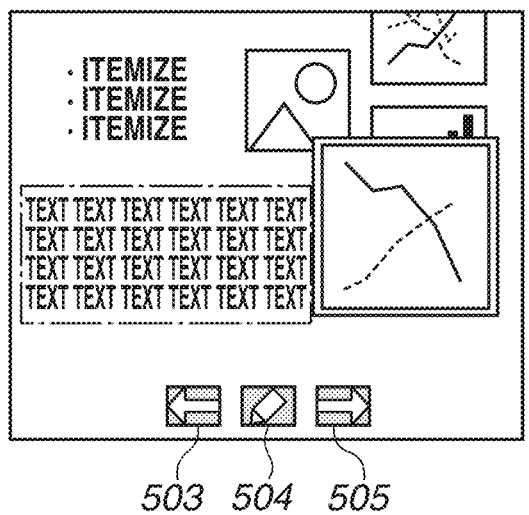
Figure 10D:
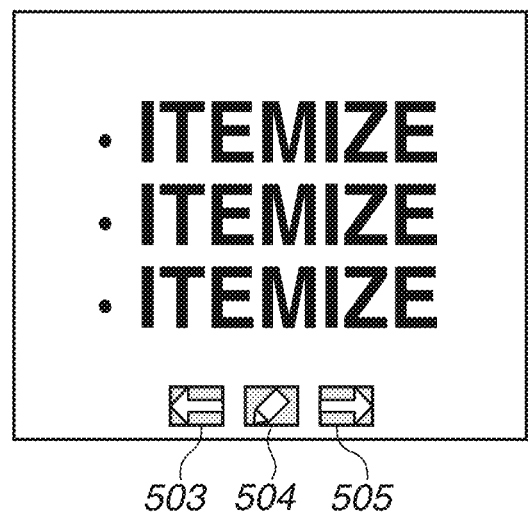

FIG. 10C illustrates a presenter image when the marker mode is OFF and the current object is an object C in the highlight display mode. The succeeding object is an object I, and the object I is included in a succeeding page. Accordingly, the object I is floating-displayed. The presenter image is generated in the presenter image generation processing when processes in steps S401, S402, S411, and S413 are executed in this order by the CPU 1905. At this time, the current object C is enlarged and displayed as an audience image on the screen 109.

FIG. 105 illustrates a presenter image when the marker mode is ON and the current object is the object C in the highlight display mode. The object C is enlarged and displayed so that marker editing is easily performed on a terminal of a presenter. The presenter image is generated in the presenter image generation processing when processes in steps S401, S412, and S413 are executed in this order by the CPU 1905.

According to the above described exemplary embodiment, when a current object is displayed, a display magnification is determined so that a content of a succeeding object is easily grasped, and a display position of the succeeding object is determined so that a positional relationship in the original layout can be maintained as much as possible. Further, if a marker mode is ON, only the current object is displayed so as to fit entirely into the screen. Consequently, since the current object is displayed on an enlarged scale, if the marker mode is turned on, the user can easily perform editing operation.

The above described configurations make it easy for the user to immediately consider a content to be explained in a situation where the as needs to consider whether the content is to be explained while talking, for example, when explaining the content to a partner while showing materials in presentation.

The present invention can also be implemented through processing for supplying a program for implementing one or more functions in the above described exemplary embodiment to a system or an apparatus via a network or a storage medium and reading out and executing the program by one or more processors in a computer in the system or the apparatus. The present invention can also be implemented by a circuit (e.g., Application Specific Integrated Circuit (ASIC)) for implementing one or more functions.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s) The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-015214, filed Jan. 29, 2015, which is hereby incorporated by reference herein in its entirety.

What is claimed is:

1. An information processing apparatus to communicate with an external screen output apparatus, the information processing apparatus comprising:
   a display capable of displaying information; and
   at least one controller that performs:
   acquiring a page that includes at least a first object, a second object positioned in a direction with respect to the first object, and a third object positioned between the first object and the second object,
   controlling to change a first screen to be output by the external screen output apparatus to a second screen based on having received a predetermined instruction, wherein the first screen is a screen having part of the page enlarged including at least the first object, and the second screen is a screen having part of the page enlarged including at least the second object, and
   displaying a third screen on the display while the first screen is output by the external screen output apparatus, wherein the third screen is a screen having part of the page enlarged including at least the first object, and wherein the third screen further has the second object disposed adjacently to the first object in the direction with respect to the first object, without regard to the third object.

2. A non-transitory storage medium storing a program to cause a computer to perform a method for controlling an information processing apparatus having a display capable of displaying information and to communicate with an external screen output apparatus, the method comprising:
  acquiring a page that includes at least a first object, a second object positioned in a direction with respect to the first object, and a third object positioned between the first object and the second object;
  controlling to change a first screen to be output by the external screen output apparatus to a second screen based on having received a predetermined instruction, wherein the first screen is a screen having part of the page enlarged including at least the first object, and the second screen is a screen having part of the page enlarged including at least the second object; and
  displaying a third screen on the display while the first screen is output on the display by the external screen output apparatus, wherein the third screen is a screen having part of the page enlarged including at least the first object, and wherein the third screen further has the second object disposed adjacently to the first object in the direction with respect to the first object, without regard to the third object.

3. The non-transitory storage medium according to claim 2, wherein controlling includes controlling the external screen output apparatus to change the first screen to the second screen by sending information of the second screen to the external screen output apparatus.

4. The non-transitory storage medium according to claim 2,
  wherein the page includes a plurality of objects having a predetermined order, the plurality of objects including the first and second objects, and
  wherein the predetermined instruction is instruction to change a targeted object from a current object to a succeeding object.

5. The non-transitory storage medium according to claim 4,
  wherein a fourth screen is displayed on the display while a last object of an end of the predetermined order of the page is output by the external screen output apparatus, and
  wherein the fourth screen is a screen having part of the page enlarged including at least the last object, and wherein the fourth screen further has a first object of a succeeding page disposed adjacently to the last object in a predetermined direction.

6. The non-transitory storage medium according to claim 2,
  wherein the display is a touch panel, and
  wherein the display is able to receive touch operation for the predetermined instruction via the touch panel displaying the third screen.

7. The non-transitory storage medium according to claim 2, wherein an instruction object for the predetermined instruction is disposed in the third screen.

8. The non-transitory storage medium according to claim 2, wherein the first object is highlighted and displayed in the third screen.

9. The non-transitory storage medium according to claim 2, wherein the second object disposed adjacently to the first object is enlarged in the third screen.

10. The non-transitory storage medium according to claim 9,
  wherein attribute of an object is one attribute from a plurality of attributes including characters and graphics, and
  wherein a display magnification of the second object is determined based on attribute of the second object at least.

11. The non-transitory storage medium according to claim 2, wherein the third screen is a screen in which the second object is superposed on an image having part of the page enlarged including at least the first object.

12. The non-transitory storage medium according to claim 2, wherein the second object is displayed to be floating in the third screen.

13. The non-transitory storage medium according to claim 2, wherein the external screen output apparatus is a projector.

14. An information processing system comprising:
  an information processing apparatus having a display capable of displaying information; and
  an external screen output apparatus that communicates with the information processing apparatus, wherein the information processing apparatus performs:
  acquiring a page that includes at least a first object, a second object positioned in a direction with respect to the first object, and a third object positioned between the first object and the second object,
  controlling to change a first screen to be output by the external screen output apparatus to a second screen based on having received a predetermined instruction, wherein the first screen is a screen having part of the page enlarged including at least the first object, and the second screen is a screen having part of the page enlarged including at least the second object, and
  displaying a third screen on the display while the first screen is output on the display by the external screen output apparatus, wherein the third screen is a screen having part of the page enlarged including at least the first object, and wherein the third screen further has the second object disposed adjacently to the first object in the direction with respect to the first object, without regard to the third object, and
  wherein the external screen output apparatus changes an output from the first screen to the second screen based on the controlling of the information processing apparatus.

15. The information processing system according to claim 14, wherein controlling includes controlling the external screen output apparatus to change the first screen to the second screen by sending information of the second screen to the external screen output apparatus.

16. The information processing system according to claim 14,
  wherein the page includes a plurality of objects having a predetermined order, the plurality of objects including the first and second objects, and
  wherein the predetermined instruction is instruction to change a targeted object from a current object to a succeeding object.

17. The information processing system according to claim 14,
  wherein the display is a touch panel, and
  wherein the display is able to receive touch operation for the predetermined instruction via the touch panel displaying the third screen.

18. The information processing system according to claim 14, wherein an instruction object for the predetermined instruction is disposed in the third screen.

19. The information processing system according to claim 14, wherein the first object is highlighted and displayed in the third screen.

20. The information processing system according to claim 14, wherein the second object disposed adjacently to the first object is enlarged in the third screen.

* * * * *